July 2, 1940.  J. W. ETES  2,206,172
AMUSEMENT DEVICE
Filed April 4, 1938  6 Sheets-Sheet 1

INVENTOR
James W. Estes

July 2, 1940.  J. W. ETES  2,206,172
AMUSEMENT DEVICE
Filed April 4, 1938   6 Sheets-Sheet 2

INVENTOR
James W. Estes

July 2, 1940.         J. W. ETES         2,206,172
AMUSEMENT DEVICE
Filed April 4, 1938         6 Sheets-Sheet 4

INVENTOR
James W. Estes

July 2, 1940.  J. W. ETES  2,206,172
AMUSEMENT DEVICE
Filed April 4, 1938  6 Sheets-Sheet 5

INVENTOR
James W. Estes

July 2, 1940.  J. W. ETES  2,206,172
AMUSEMENT DEVICE
Filed April 4, 1938  6 Sheets-Sheet 6

INVENTOR
James W. Estes

Patented July 2, 1940

2,206,172

UNITED STATES PATENT OFFICE 2,206,172

AMUSEMENT DEVICE

James W. Estes, Travis County, Tex.

Application April 4, 1938, Serial No. 199,974

16 Claims. (Cl. 272—37)

My invention relates to new and useful improvements in rotary amusement device adapted for popular resorts and embodies a rotary member, a plurality of turntables equally spaced within the plane of the rotary member, passenger vehicles with swivel connection near the perimeter of turntable for unrestricted rotary motion. Turntables are rotated trailing vehicles in a semicircle radially; at predetermined points rotation of turntable is reversed and the momentum of vehicles will cause vehicles to make a complete revolution about its axis, the suddenness of which causes agitation or commotion to the occupants. Turntables and vehicles move in an orbit with the rotary member; and the rotation and reverse rotation of turntable is limited and automatically controlled, at times a very slow speed, then a sudden, rapid movement, of the vehicles, that thrills and excites the patrons is provided.

One object of this invention is to provide a novel means of imparting to the passenger vehicles a combination of orbital, radial, and rotary or spinning movement.

Another object of the invention is the provision of a simple, effective, and novel timing means between the rotary platform and power unit, whereby power is intermittently transmitted to the passenger vehicles for increasing and for retarding the motion of said vehicles.

Another object is to provide simple and flexible means between the driving mechanism and the driven mechanism.

One other object of this invention is to provide an amusement device of simple and effective construction, which eliminates heavy and cumbersome materials, saves in initial cost of production and transportation, occupies less space, is readily installed and operated, thoroughly reliable and safe in operation, and is adapted for use with small itinerant amusement companies.

As a further object of this invention, the provision of a modified form in the transmission of power between the power unit and the vehicles comprises mostly the simple application of pulleys and cables.

With the above and other objects in view, the invention consists of certain novel features of construction, combination and arrangement of parts as will be more fully described and emphasized in the appended claims, although preferred forms have been shown, a mechanic working within the scope of what is claimed may make changes without departing from the spirit of the invention.

In accordance with my invention as applied to a machine of the style in which passenger vehicles are moved upon a revolving platform, each vehicle is securely mounted, to and near the perimeter of turntable, and each turntable is mounted rigidly upon the upper end of a vertical shaft journaled in a bearing carried on the rotary platform. Beneath the turntable the shaft carries a grooved pulley adapted to receive a wire cable or other flexible element; this element is entwined about said pulley with its ends fast to the ends of a bar; in one end of bar is a bearing fitted to crank-pin on a crank on the upper end of a vertical shaft in the center beneath the rotary platform. The crank-pin, being eccentric to the center of the rotary platform, will impart an inward and an outward movement to the connecting bar when either platform or crank is being revolved. If both platform and crank be revolved at the same time in opposite directions, the inward and outward movement of the connecting bar will be increased. The engaging cable will turn pulley alternately in opposite directions, the same movement is imparted to the turntable, bringing about alternately an inward and an outward and a rotary movement to the passenger vehicles. Means for changing speed of a vehicle are a timing device operative between the rotary platform and a power unit that automatically applies power to revolve the crank and to a braking device to stop revolution of the crank. Therefore, if the crank is held stationary, the movement of the connecting bar will be in and out each revolution of the rotary platform, revolving the crank in opposite direction of rotation of the rotary platform will double or treble the cycle of trailing and rotary movement of the vehicle according to the ratio of revolution of the rotary platform and the crank.

Accordant with my invention, the application to the modified form of the timing device and the automatic mechanism will cause practically the same results as in the preferred form; in the operation of the modified form, the grooved drum wheel is held stationary one-half revolution of the rotary platform, which will wind cable on the grooved drum wheel, releasing brake to the drum wheel and revolving in same direction at a faster speed than that of the rotary platform, will wind cable in opposite direction that will turn the turntable forward and backward imparting an inward and an outward and a rotary spinning movement to the vehicle.

Similar characters of reference indicate corresponding parts in all the views.

Referring in detail to the drawings, like numbers designate like parts. This invention embodies in construction a stationary platform 30, Figure 4; an annular track 46, Figures 6 and 15; a rotary platform 1, turntables 3, and passenger carrying vehicles, Figures 1, 2, 6 and 15.

Figures 4, 12, 13:
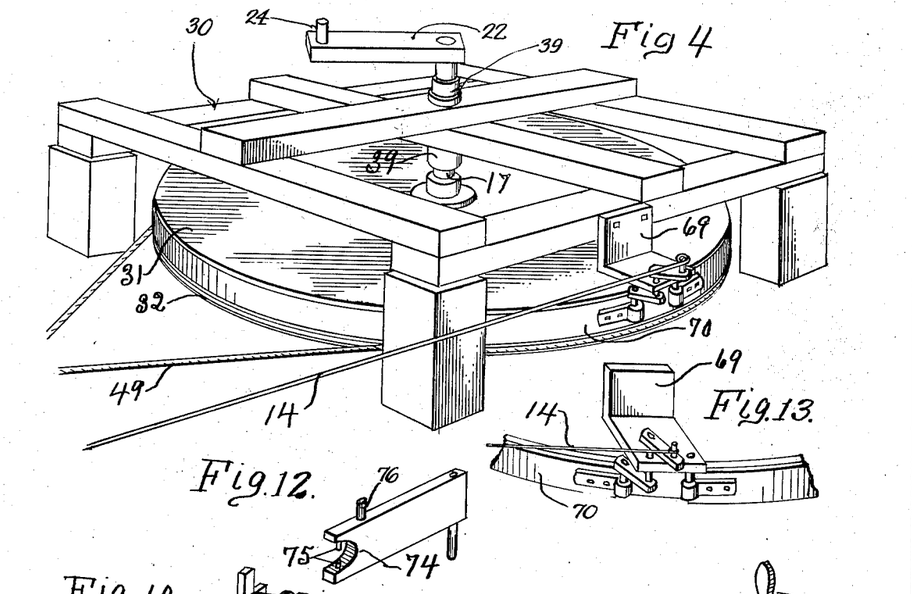
Figure 4 represents a perspective view of the stationary platform, including all of the essential parts.
Figures 10, 11, 12 and 13, show other details of construction.
Figure 6:
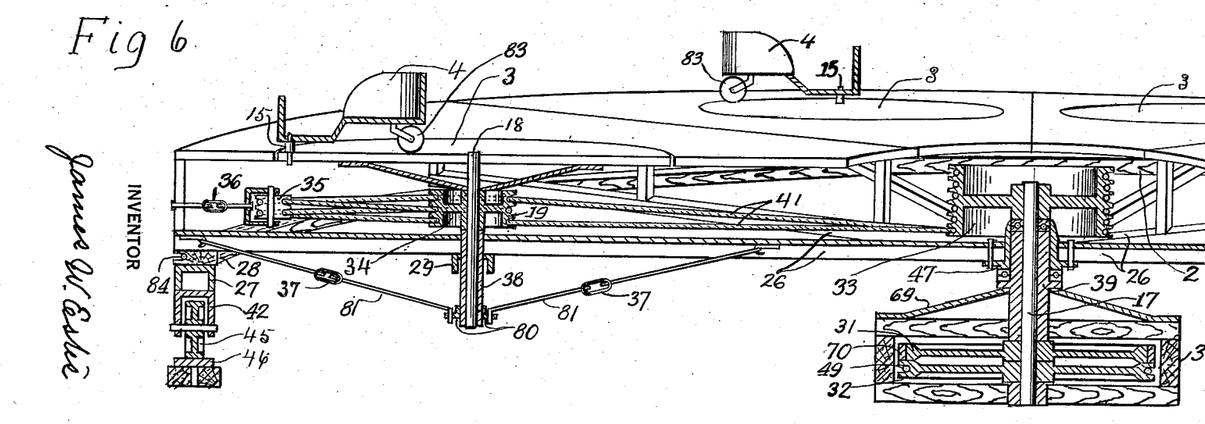
Figure 6 represents a schematic fragmentary vertical, sectional view depicting in part the modification arrangement of pulleys and cables.
Figure 15:
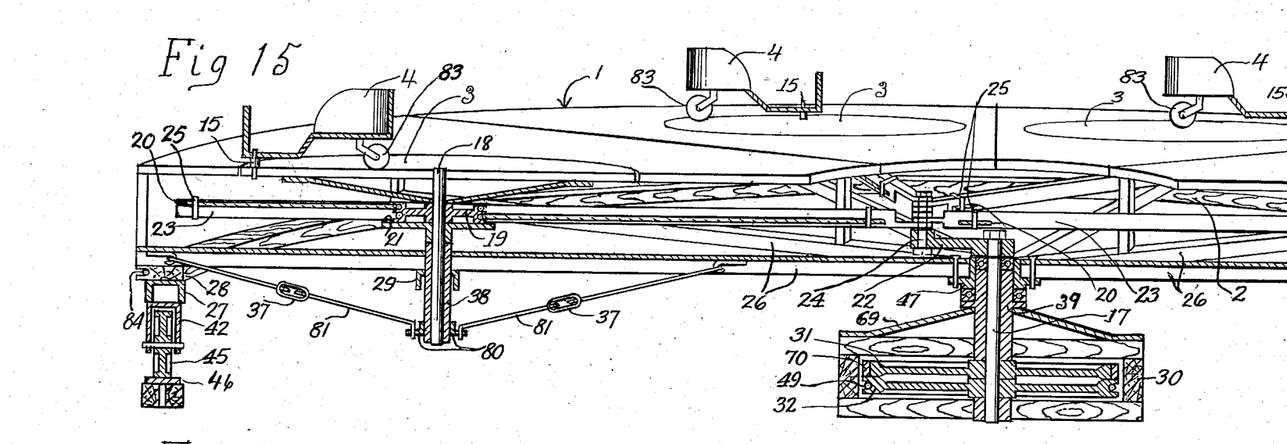
Figure 15 is a detailed schematic view of a vertical cross section through one side at the center of the device showing turntable vehicles, the stationary platform and the gearing mechanism.

The stationary platform can be constructed of any suitable material, having a base and an arch for support of sleeve bearing 39 in a perpendicular position for rotatably mounting vertically crank shaft 17 Figs. 4, 6 and 15. The upper end of sleeve bearing 39 is journaled and hub 41 is rotatably mounted thereon. On the lower end of shaft 17 is secured a brake-drum 31 and pulley 32, and encircling the brake-drum is a steel band 70, known as brake-band.

Figure 1:
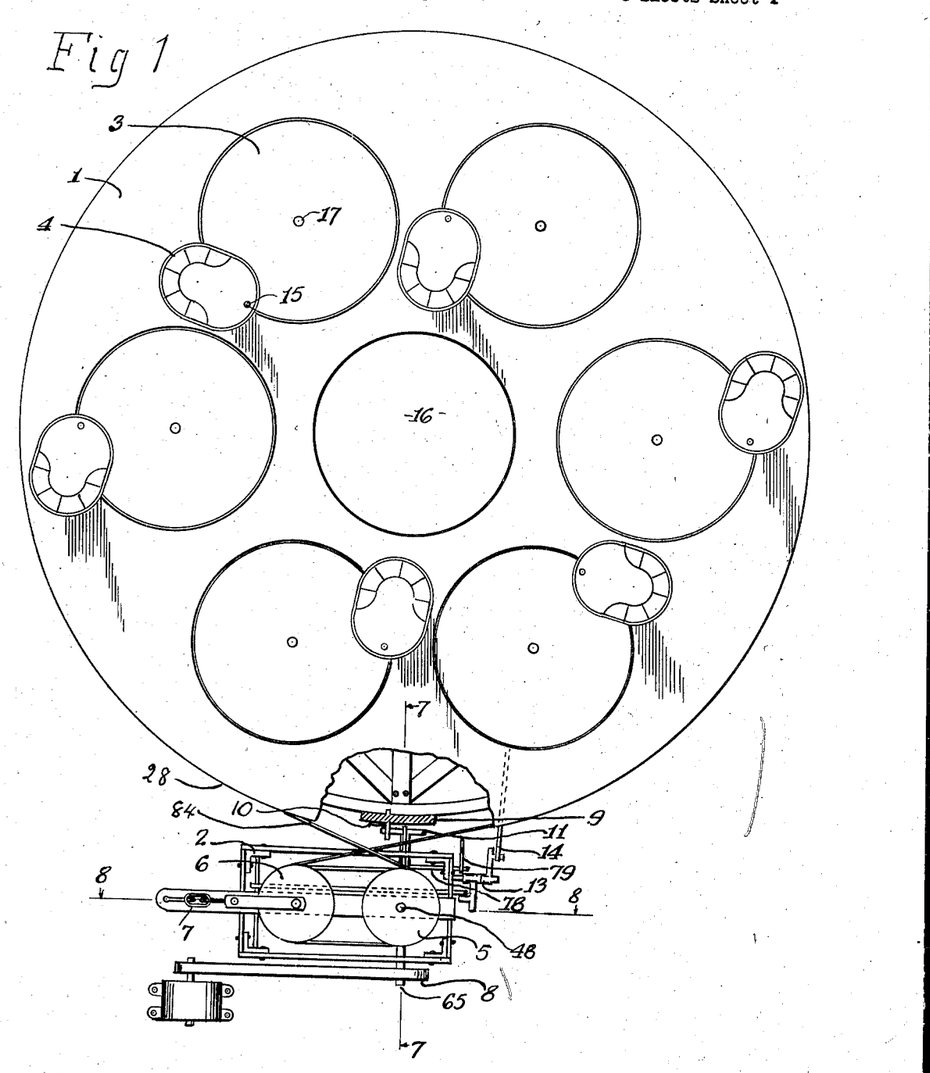
Figure 1 is a top view of the complete amusement device; a portion being cut away to show the timing device later described.
Figure 2:
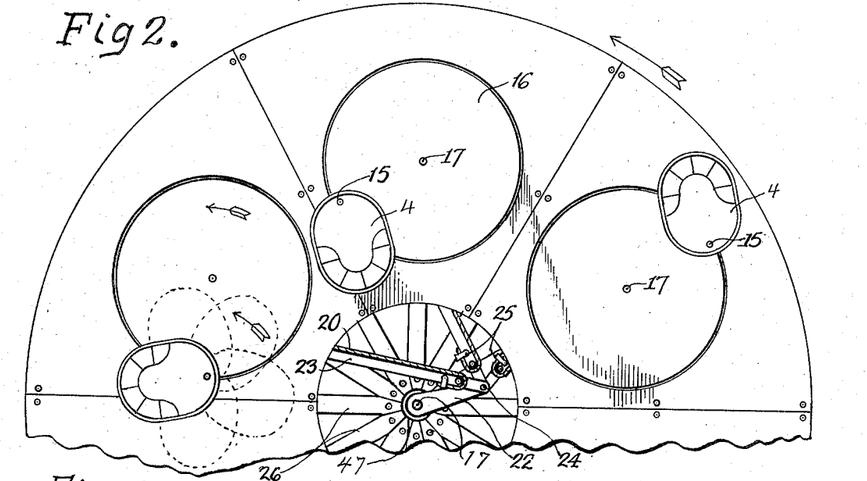
Figure 2 is a fragmentary top plan view of substantially half of the apparatus, showing position of turntables and vehicles relative to motion.
Figure 3:
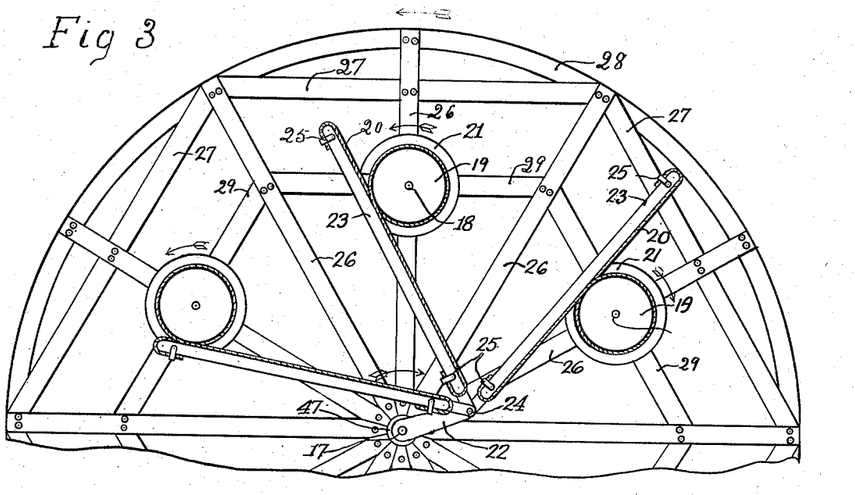
Figure 3 is a fragmentary top plan view showing substantially half of the apparatus with the deck and turntables removed, showing the crank and attendant parts.

The levers on bracket 69, Figures 4 and 13, will bring the brake-band in friction contact with the brake-drum, when the rod 14 attached to lever on bracket 69 is pulled. Rod 14 extends to the power unit 2, in Figures 1 and 8. And securely mounted on the upper end of shaft 17 is a crank 22, having a crank-pin 24 and rotatably connected to one end of a connecting bar 23, Figures 3 and 15. A cable 20 has one end secured to the inner end of connecting bar 23 with a U clamp 25 and passed along the side of connecting bar 23 and turned around pulley 19 thence to the outer end of connecting bar 23 and secured with another U clamp 25, as shown in Figures 3 and 15. The annular rotary platform comprising a hub 47, Figures 3 and 6 and 15 is rotatably mounted on sleeve bearing 39 with radial arms 26, cross members 27 and 29, bracing and retaining the arms in radial disposition. Secured to and underneath the outer ends of radial arms is provided an annular rim 28. The outer edge of rim is grooved to receive cable 84, Figures 1, 6 and 15. A U wheel mount 42, is mounted underneath rim 28, and depends at the outer end of radial arm 26, a wheel 45 is mounted in U wheel mount 42, and rolls on annular track 46, Figures 6 and 15. Placed near midway between the inner and the outer ends of radial arms 26, and at the crossing of brace member 29, is a sleeve bearing 38, which extends downwardly, Figures 6 and 15. A flange 80 is provided at the lower end of the bearing 38 with holes to receive bent end of truss rod 81. Turnbuckle 37, and truss rod 81, support and hold sleeve bearing 38 in a perpendicular position, to the plane of the rotary platform. A vertical shaft 18 is rotatably mounted in bearing 38, a pulley 19 is securely mounted near the upper end of shaft 18, a circular extending flange 21, projects from this pulley so as bar 23, can ride thereon; rigidly mounted on upper end of shaft 18 is a turntable 3, Figures 1, 2, 6 and 15, mounted to rotate in plane of the rotary platform. A stud post 15 mounted vertically near the perimeter of turntable has the upper end journaled for rotatably mounting vehicle 4 so as to have unrestricted rotary movements, caster wheels 83 supporting the rear end of vehicle facilitate the rotary motion.

Figures 7, 8, 14:
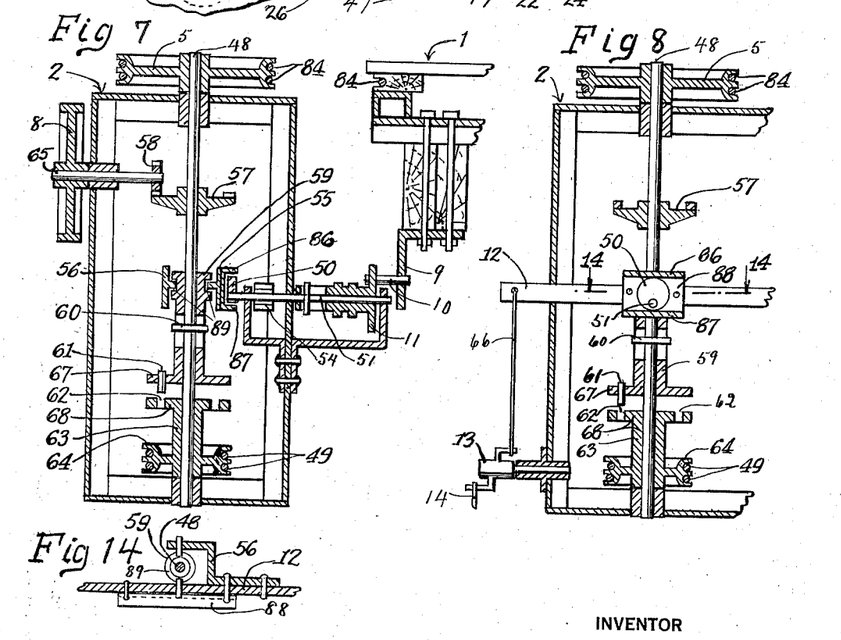
Figure 7 shows a sectional view of the power unit taken on line 7—7 of Figure 1.
Figure 8 is a sectional vertical view of power unit taken on line 8—8 of Figure 1.
Figure 14 is a sectional view of Figure 8 taken on line 14—14 of Figure 8.
Figures 9, 10, 11:
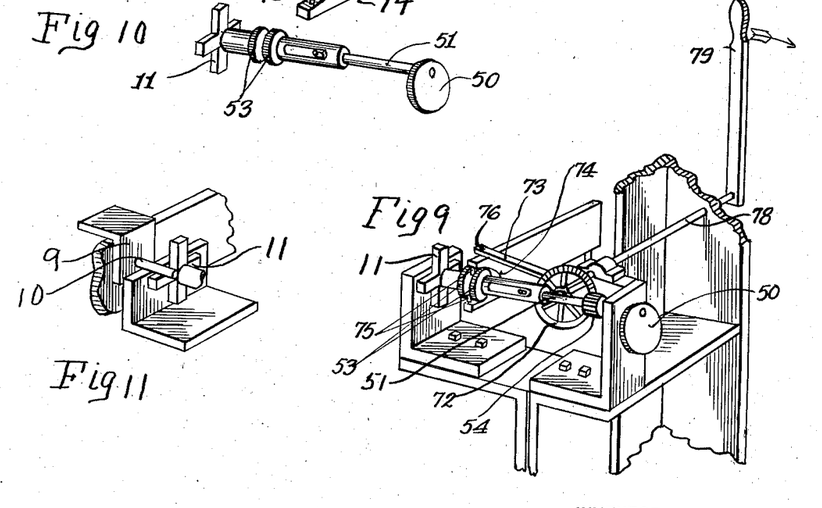
Figure 9 represents a perspective of the automatic mechanism of the power unit.

Referring to the power unit in Figs. 1, 7, 8, and 9, this consists in the construction of the following: a steel framed structure operating gearing mounted therein for driving the annular rotary platform, and automatically controlling and operating the passenger vehicles. There is a pulley wheel 8 driving by any suitable power a horizontal shaft 65, a pinion mounted thereon meshing with bevel gear 57, mounted on vertical counter shaft 48, within the center of said steel framed structure. A pulley 5 is mounted on shaft 48, turning in the plane of the rotary platform; a pulley 6 is mounted in same plane of the rotary platform, in a sliding mechanism having turnbuckle for taking care of slack and tension of cable 84, same cable being engaged by the two said pulleys and the grooved rim 28 on the annular rotary platform for revolving the same. A sliding member 59 is mounted to slide freely on shaft 48, and made to revolve with shaft 48 by the pin 60, through hole in shaft 48, the ends extending out to engage in the slot in sliding member 59. A disk 67 on the lower end of sliding member has mounted thereon pin 61 near the outer edge thereof; in operation it is made to engage in hole 62 in disk 68 on the upper end of sleeve 63, that is rotatably mounted on shaft 48. A double grooved pulley 64 is securely mounted on the lower end of sleeve 63, a cable 49 as shown in Figs. 4 and 7, is entwined about the pulley 64 then to and around an idler (not shown in the drawings for lack of space) then back to and around pulley 64, thence to pulley 32. The idler and a turnbuckle for taking care of slack in cable 49 is arranged in a manner the same as the pulley 6, and the turnbuckle that takes care of the slack in cable 84. (Any means for holding the cable 49 tight can be interposed between the two pulleys 32 and 64.) Referring to Figure 8, means is shown for raising and lowering sliding member, 59, so as to engage pin 61 into hole 62, so as to rotate disk 68, sleeve 63, and pulley 64. A lever bar, 12, has secured thereon a plate 88 with flanges 86, 87, outstanding therefrom to engage with the perimeter of cam 50 that is mounted on shaft 51. Attached to the reverse side of lever bar 12 from plate 88 are the fork members 55 and 56, with pins that engage in groove 89 in the sliding member 59, as clearly shown in Figure 14. Referring to Figure 8 again, a pull rod 66 is connected between lever 12 and lever assembly 13, to the latter is attached the assembly pull rod 14 extending to the brake assembly as shown in Figures 4 and 13. Means for automatic change of speed of the vehicles is illustrated in Figures 9, 10, 11 and 12. The timing device between the rotary platform and the power unit is operated each revolution of the rotary platform. A bracket 9, fast to the perimeter of the rotary platform, carries a stud pin 10, which projects outwardly therefrom engage to turn spoke wheel 11, as shown in Figures 9 and 11, turning spoke wheel will turn shaft 51 and cam 50. In Figure 9, a lever 79, when pulled down in direction of the arrow, will turn shaft 78 that turns segmental gear 72, pulls bar 73, connected at 76 to fork 74, pins 75, will slide spoke wheel away from line of motion of stud pin 10, so spoke wheel will not be turned when the rotary platform is revolved. The toothed sector of segmental gear in engaging pinion 54 turns cam 50 one-quarter of a revolution to a position that is neutral to clutch and brake mechanism, thus allowing a normal rotary movement of the device.

Figure 5:
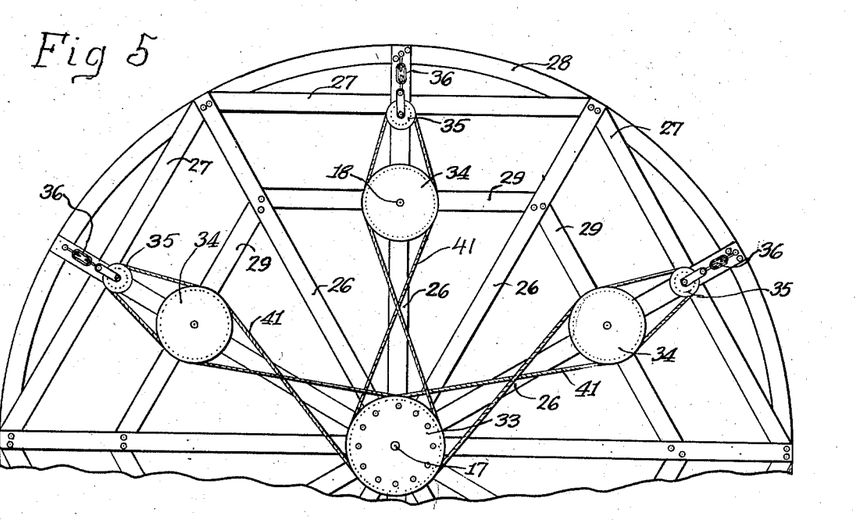
Figure 5 is a diagrammatic view of a modified form with deck and turntables removed, showing arrangement of pulleys and cables.

Referring in detail to the drawings of the modified form, shown in Figures 5 and 6, the stationary platform and the rotary platform are constructed the same as those using the crank and connecting bar. I use a grooved drum wheel 33 with the same number of grooves as there are of vehicles. This grooved drum wheel is mounted on the upper end of shaft 17. A three-grooves pulley 34 is mounted on the upper half of shaft 18, Figure 6. A two grooved pulley 35, and turnbuckle 36 are used for taking up the slack in cable 41, which turns around drum wheel 33, then onto pulley 34 to pass on and around pulley 35 back to and around pulley 34, back again to and around pulley 35, then again to pulley 34 and back to drum wheel 33. I use two timing devices; each embodies a bracket 9 and a pin 10 diametrically on opposite sides of rotary platform, the timing device will cause the spoke wheel 11 to register each half revolution of the rotary platform, alternately operating the clutch, in the power unit, to transmit power through connections to turn the drum wheel, and to operate the brake mechanism to hold fast the drum wheel. When groove drum wheel is held fast and the rotary platform revolved, will wind cable on drum wheel, will rotate turntable forward also, trailing the passenger carrying vehicle. The two timing devices will register each half revolution of the rotary platform. Automatically the brake is released and the clutch will operate to cause the drum wheel to be revolved one half turn, in the same direction, and at twice the speed of the rotary platform, winding the cable the opposite direction reversing turntable also rotating vehicle about its axis and reversing the trailing movement of the vehicle.

Figure 16:
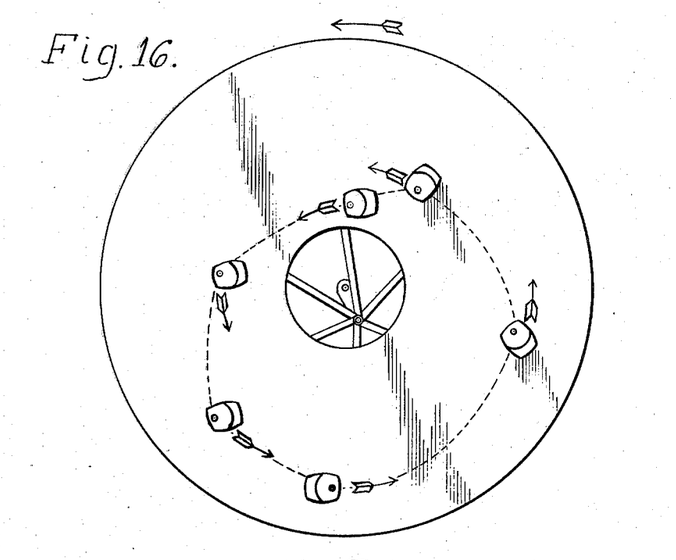
Figures 16 and 17 are diagrams showing the path through which the vehicles pass while the device is being operated.
Figure 17:
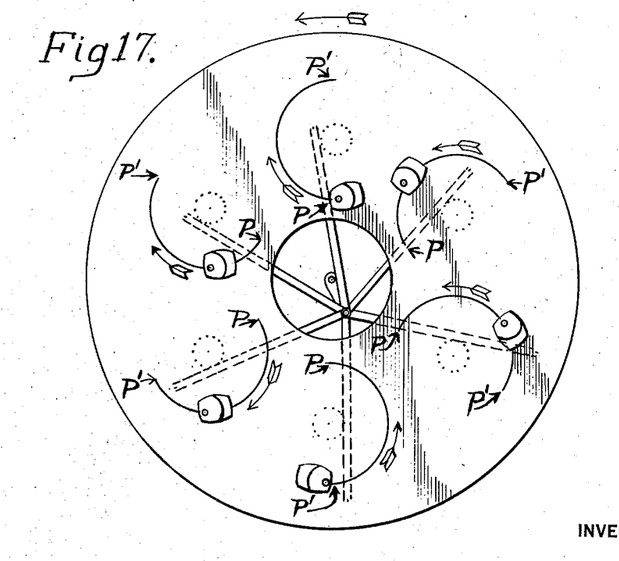

Referring to drawings, showing the path through which the vehicle will pass, while the device is being operated, Figure 16, dotted lines and arrows, describe the orbital movement of the vehicle, around the opening in the center of the annular platform. Figure 17 shows the radial or inward and outward movement in a semi-circle, indicated by P and P' which are points on the radius of the annular rotary platform and are also the points of predetermined reversal of rotation of the turntable, indicated by arrows. The rotary movement of the vehicle, about its axis (the pivotal connection of vehicle to turntable), is shown and indicated by dotted lines at the inner-most vehicle in Figure 2.

From the foregoing description, one can see that when proper power is applied the rotary platform will revolve about shaft 17, and the connection that has been mentioned will bring about an orbital, a radial, a semi-circular, and a rotary movement of the vehicle.

Each revolution of the rotary platform will result in the timing device to register intermittent rotation of cam 50, alternately applying power to revolve and to stop revolving of the crank, thus bringing about sudden change from slow to fast movement of the vehicle, the unusual suddenness of which affords the patrons considerable amusement and merriment.

Although for the sake of clearness I have described in detail the embodiment of the principles of my invention shown in the drawings, although preferred forms have been shown, one constructing the device within the scope of what is claimed may make changes without departing from the spirit of the invention.

Having thus described my invention I claim broadly:

1. In an amusement device of the character described, a combination of a stationary platform, an annular rotary platform, means for supporting the rotary platform for rotation, a sleeve bearing extending downwardly and upstanding of the center of stationary platform and journaled at the upper end, a hub rotatably mounted thereon, arms radiating therefrom, a wheel mount depending from the outer end of arm, a wheel to ride on, a circular track concentrical of the stationary platform, a turntable, means to mount same rotatably on and in the plane of the annular platform, a sleeve bearing extending downwardly intermediate the ends of radial arm, a vertical shaft operative therein, the upper end of said shaft substantially supporting said turntable, a stud upstanding from near the perimeter of turntable and journaled for rotatable connection to passenger vehicle.

2. In an amusement device of the character described, the combination of a stationary platform, an annular rotary platform, a sleeve bearing extending downwardly and upstanding in the center of the stationary platform, the upper end journaled to receive rotatably a hub, a vertical shaft extending downwardly rotatably through said sleeve bearing, a drum wheel secured to said shaft beneath the bearing, a steel band around said drum wheel known as a brake-band and attached to a brake mechanism, and attached to said brake mechanism a pull rod extending to a power unit, a pulley secured to said shaft beneath drum wheel, and a cable entwined about said pulley extending on the upper end of said vertical shaft being a crank and an arm operatively connected to a passenger vehicle.

3. In an amusement device of the character described, the combination of a stationary platform, an annular rotary platform, means for supporting the annular platform for rotation, a sleeve bearing extending downwardly and upstanding in the center of the stationary platform and journaled at the upper end, a hub rotatably mounted thereon, arms radiating therefrom, a wheel mount depending from the outer end of radial arm and a wheel to roll on a circular track concentrical to the center of the stationary platform, a vertical shaft extends downwardly rotatably through a sleeve bearing in center of the stationary platform, a drum wheel and a pulley wheel secured to said vertical shaft beneath the sleeve bearing and a brake mechanism attached to said drum wheel, a pull rod extending from said brake mechanism to a power unit, a flexible driving element to said pulley; on the upper end of said shaft is a crank and an arm operatively connected to a passenger carrying vehicle.

4. In an amusement device of the character described, the combination of a stationary platform, an annular rotary platform, means for supporting the rotary platform for rotation, a sleeve bearing extending downwardly and upstanding in the center of the stationary platform and journaled at the upper end, a hub rotatably mounted thereon, arms radiating therefrom, a wheel mount depending from the outer end of radial arms, a wheel mounted therein so as to ride on a circular track concentrical of the center of the stationary platform, a sleeve bearing extending downwardly intermediate the outer and inner ends of said radial arm, truss rods, and turnbuckles provide a support and a means for adjusting said sleeve bearing perpendicular to the plane of the rotary platform, for operatively receiving a shaft that supports a turntable, that trails a vehicle back and forth on a semicircle and rotates said vehicle alternately.

5. In an amusement device of the character described, the combination of a stationary platform, an annular rotary platform, a plurality of turntables being rigidly mounted on the upper ends of shafts vertically disposed, said shafts are journaled and equally spaced on said rotary platform, a stud upstanding is mounted near the perimeter of said turntables, a plurality of passenger vehicles, each vehicle rotatably mounted to the stud on the turntable, means for rotating said turntable, said means comprising a grooved pulley wheel carried underneath the turntable on said vertical shaft, a cable or flexible element coiled about said pulley and connected at the ends thereof to ends of a connecting bar, driving means to reciprocate movement of said connecting bar to rotate said vehicles and automatic means to cause alternate slow and fast movement of said vehicle.

6. In an amusement device of the character described, the combination of a stationary platform, an annular rotary platform, a plurality of turntables, and a plurality of passenger vehicles, said turntables being rigidly mounted on the upper ends of a shaft vertically disposed, a pulley wheel carried underneath turntable on said vertical shaft, a cable or flexible element coiled about said pulley and connected at the ends thereof to the ends of a connecting bar, driving means to reciprocate said connecting bar, said means comprising a crank on upper end of a vertical shaft upstanding of the center of the stationary platform, a crank pin upstanding on the outer end of said crank being operatively fitted to end of connecting bar, means for alternatingly trailing and rotating said vehicle on annular rotary platforms, and automatic means to cause alternate slow and fast movement of said vehicle.

7. In an amusement device of the character described, the combination of a stationary platform, an annular rotary platform, a plurality of turntables, and a plurality of passenger vehicles, said vehicles being rotatably mounted on said turntables, said turntables being rigidly mounted on the upper ends of shafts vertically disposed, a pulley carried underneath turntable on said vertical shafts, a cable or flexible element coiled about said pulley and connected at the ends thereof to ends of a connecting bar, one end of said connecting bar is operatively fitted to a crank pin on a crank on a vertical shaft upstanding from center of stationary platform, said vertical shaft carrying on its lower end a driven pulley that turns crank shaft, reciprocates connecting bar, rotates turntable, alternately trailing and rotating said vehicle, and means for automatic change of speed for rotating vehicle.

8. In an amusement device of the character described, the combination of a stationary platform, an annular rotary platform, a plurality of turntables, a plurality of passenger vehicles pivotally connected to the turntables, said vehicles rotatably mounted on said turntables, means to move and rotate said vehicles on said rotary platform, said means comprising a crank shaft upstanding of the center of stationary platform, on the lower end of crank shaft is carried a driven pulley, a connecting bar having at one end a bearing fitted on a crank pin on said crank, to end of connecting bar is fastened one end of a flexible element that is wound about a pulley, the free end made fast to opposite end of connecting bar, said pulley is carried on vertical shaft supporting turntable, the crank pin on said crank being eccentric to the center of the annular platform, so that revolving said platform brings about an alternate inward and outward movement of said connecting bar, a forward and backward movement of turntable, a trailing and rotary movement of said vehicle, and automatic means to cause alternate slow and fast movement of said vehicle.

9. In an amusement device of the character described, the combination of a stationary platform, an annular rotary platform, a plurality of turntables mounted on vertical shafts and carried on said rotary platform, a plurality of passenger vehicles each vehicle rotatably mounted on said turntables, means for automatic change of speed and rotation of said vehicles, said means comprising a power driven unit having special gear connection for rotating the annular platform, gears for alternately rotating, stopping, and holding fast the vertical crank shaft upstanding of the center of said stationary platform, therefore bringing about a slow and a rapid movement of said vehicle, and means to bring about automatic shifting of gears.

10. In an amusement device of the character described, constructed as set forth in preceding claim 9 having means between annular platform, and power driven unit operative each revolution of annular platform, to bring about the operation of automatic device of power driven unit, said means comprising a bracket peripherally placed on annular platform, a pin outstanding from said bracket operatively engaging a spoke wheel adjacent annular platform on said power driven unit, causing intermittent rotary movement of a spoke wheel, each revolution of the annular platform rotating the spoke wheel one-fourth turn, and turning a shaft and a cam that alternately operates clutch to mechanism that revolves crank upstanding center of stationary platform, and the brake to mechanism that stops and holds crank stationary, and means whereby an operator can change and control said automatic mechanism.

11. In an amusement device of the character described, constructed as set forth in preceding claim 9 means operative each revolution of annular rotary platform for bringing about the operation of automatic device of power driven unit, means comprising a bracket peripherally placed on annular platform, a pin outstanding from said bracket operatively engaging a spoke wheel on side of power driven unit adjacent the annular platform causing intermittent rotary movement of said spoke wheel and a shaft and a cam that operate the automatic mechanism of the power driven unit, a manually operated lever that will turn a shaft and a segmental gear wheel having a sector of teeth engaging a pinion gear on same said cam shaft, carrying spoke wheel and cam, a connecting rod operative between the segmental gear wheel and a pivoted arm having a fork engaging a sliding element to shift spoke wheel away from line of movement of pin on bracket on rotary platform, therefore upon operation of the lever segmental gear will turn shifting spoke wheel away from contact with pin on bracket, sector teeth on segmental gear wheel engaging pinion on cam shaft turning cam to a neutral position relative to the clutch and brake mechanism, allowing vehicles to move at a normal speed.

12. In an amusement device of the character described, the combination of a stationary platform, an annular rotary platform, a sleeve bearing extending downwardly and upstanding from the center of stationary platform and journaled at the upper end thereof, a hub rotatably mounted thereon, arms radiating therefrom, a wheel mount depending from the outer ends of radial arms carrying a wheel, a circular track concentrical of the stationary platform, a drum wheel having a plurality of circumferential grooves adapted for receiving cables or other flexible elements substantially mounted on the upper end of a vertical shaft operating in the sleeve bearing upstanding from center of stationary platform, a sleeve bearing extending downwardly intermediate the outer and inner ends of radial arms, truss-rods and turnbuckles forming a support and means for adjusting the sleeve bearing perpendicularly to the plane of rotary platform for operatively receiving the shaft-supporting turntable that trails and rotates vehicles.

13. In an amusement device, a combination of a stationary platform, an annular rotary platform, means for supporting the rotary platform for rotation said means comprising a hub and arms radiating therefrom with wheels that depend downwardly at the outward end of said radial arms, a turntable rotatably mounted on and within the plane of the said rotary platform, means for rotating said turntable and at predetermined points to cause reversal of rotation of said turntable; a vertical stud shaft mounted near the perimeter of said turntable; a passenger carrying vehicle pivotally connected to said stud shaft; means for rolling forward and backward on a semi-circle said passenger carrying vehicle; means to cause said passenger carrying vehicle to rotate about its axis at each end of the semi-circular movement on and over the plane of said annular rotary platform said means comprising a centrally located crank and an arm operatively connected to said turntable with pivotal connections to said passenger carrying vehicle.

14. In a amusement device of the character described, constructed as set forth in preceding claim 9, and further comprising a timing device interposed between the propelling means and the means driven, which will cause automatically to alternately drive the driven means and to hold fast a part of the driven means, therefore, bringing about an alternate slow and fast trailing movement of the passenger carrying vehicle in a semi-circle and the rotation of said passenger carrying vehicle about its axis, on and over the plane of the rotary platform.

15. In an amusement device of the character described, the combination of a stationary platform, an annular rotary platform, means for supporting the rotary platform for rotation; a passenger carrying vehicle, means for rolling and rotating said vehicle over the plane of the said annular rotary platform; means to automatically at predetermined points, reverse the rolling and rotating of said vehicle, said means comprising a crank and an arm operatively connected to said vehicle and to a central driving pulley located inside the stationary platform.

16. In an amusement device of the character described, a combination of a stationary platform, an annular rotary platform; means to mount the mobile platform for rotation; a passenger carrying vehicle, means for rolling and rotating said vehicle on and over the plane of said rotary platform; means to automatically reverse the rolling and rotating of said vehicle at predetermined points on said rotary platform, means to automatically alternate slow rolling and rotating and fast rolling and rotating of said passenger carrying vehicle, said means comprising a crank and an arm operatively connected to said vehicle and to a central driving pulley located insde the stationary platform.

JAMES W. ESTES.